US007779939B2

(12) United States Patent (10) Patent No.: US 7,779,939 B2
Kamen et al. (45) Date of Patent: Aug. 24, 2010

(54) GUIDED CONTROL OF A TRANSPORTER

(75) Inventors: Dean L. Kamen, Bedford, NH (US); Burl Amsbury, Boulder, CO (US); J. Douglas Field, Bedford, NH (US); Christopher C. Langenfeld, Nashua, NH (US); John B. Morrell, Bedford, NH (US); Jonathan B. Pompa, La Jolla, CA (US); Jon M. Stevens, Manchester, NH (US); Jeremy B. Lund, Amherst, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 11/926,606

(22) Filed: Oct. 29, 2007

(65) Prior Publication Data

US 2008/0099265 A1 May 1, 2008

Related U.S. Application Data

(60) Division of application No. 10/462,379, filed on Jun. 16, 2003, now Pat. No. 7,546,889, which is a continuation-in-part of application No. 09/325,976, filed on Jun. 4, 1999, now Pat. No. 7,370,713, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965, which is a continuation-in-part of application No. 08/021,789, filed on Feb. 24, 1993, now abandoned, which is a continuation-in-part of application No. 10/308,888, filed on Dec. 3, 2002, now abandoned.

(60) Provisional application No. 60/336,601, filed on Dec. 5, 2001, provisional application No. 60/347,800, filed on Jan. 10, 2002, provisional application No. 60/388,937, filed on Jun. 14, 2002.

(51) Int. Cl.
B62D 61/12 (2006.01)
(52) U.S. Cl. .................... 180/7.1; 180/282; 180/41
(58) Field of Classification Search ................ 180/7.1, 180/8.1, 8.2, 8.3, 65.1, 65.8, 218, 41, 282
See application file for complete search history.

(56) References Cited

U.S. PATENT DOCUMENTS 5,143,386 A 9/1992 Uriarte
6,941,206 B2 * 9/2005 Hasegawa et al. ............. 701/38

FOREIGN PATENT DOCUMENTS

JP 04201793 A * 7/1992

* cited by examiner

Primary Examiner—Kevin Hurley
(74) Attorney, Agent, or Firm—McCormick, Paulding & Huber LLP

(57) ABSTRACT

A method for conducting the motion of a transporter under riderless conditions. The transporter has two laterally disposed primary wheels. In accordance with the method, an input is received via a user input disposed on the transporter and a control signal corresponding to the input received is generated. Then a torque is applied to the laterally disposed wheels so as propel the transporter on the basis of at least the control signal.

The control signal may correspond to either a commanded torque or to a commanded transporter velocity. The torque may include coadded terms where the terms are, respectively, proportional to the control signal, to a counteracting artificial friction proportional to the common velocity of the wheels, and a term proportional to the differential rotation of the wheels to facilitate turning of the transporter.

4 Claims, 8 Drawing Sheets

SECTION A-A

GUIDED CONTROL OF A TRANSPORTER

CROSS REFERENCE To RELATED APPLICATIONS

This application is a divisional of U.S. application Ser. No. 10/462,379 filed on Jun. 16, 2003, herein incorporated by reference, which was a continuation-in-part application of copending U.S. application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965, which in turn is a continuation in part of U.S. application Ser. No. 08/021,789, filed Feb. 24, 1993, now abandoned, from which the present application claims priority.

Co-pending U.S. application Ser. No. 10/462,379, filed Jun. 16, 2005 is also a continuation-in-part of U.S. Ser. No. 10/308,888, filed Dec. 3, 2002, now abandoned, and claims priority through the latter application from U.S. Ser. No. 60/336,601, filed Dec. 5, 2001, and U.S. Ser. No. 60/347,800, filed Jan. 10, 2002.

Finally, this application claims priority from U.S. Provisional Application No. 60/388,937, filed Jun. 14, 2002.

All of the aforementioned applications are also incorporated herein by reference.

TECHNICAL FIELD

The present invention pertains to modes for controlling a powered transporter and more particular to modes for control of a powered transporter by a user not carried by the transporter.

BACKGROUND ART

"Dynamically stabilized transporters" refer, in this application, to devices for personal locomotion having a control system that actively maintains the stability of the transporter during operation of the transporter. The control system maintains the stability of the transporter by continuously sensing the orientation, and/or changes in the orientation, of the transporter, determining the corrective action to maintain stability, and commanding the wheel motors to make the corrective action. Such a transporter is described, for example, in U.S. Pat. No. 5,971,091 (Kamen et al., issued Oct. 26, 1999), which is incorporated herein by reference. Once a rider dismounts from such a transporter, the rider cannot control the transporter's motion by leaning and the transporter is no longer useful to the rider.

Rather, the user may wish to alight from the transporter and still control its motion and it is thus desirable to provide a mode of control whereby a user may control such a transporter without boarding it and controlling it by leaning.

SUMMARY OF THE INVENTION

In accordance with preferred embodiments of the present invention, a method is provided for conducting a transporter under riderless conditions. The transporter has two laterally disposed primary wheels. In accordance with the method, an input is received via a user input disposed on the transporter and a control signal corresponding to the received input is generated. Then a torque is applied to each of the laterally disposed wheels so as propel the transporter on the basis of at least the control signal.

The control signal may correspond to either a commanded torque or to a commanded transporter velocity. The torque may include coadded terms where the terms are, respectively, proportional to the control signal, to a counteracting artificial friction proportional to the common velocity of the wheels, and a term proportional to the differential rotation of the wheels to facilitate turning of the transporter. Generating the control signal based in received input may include conditioning the signal. Conditioning may entail a deadband in the vicinity of zero signal, as well as limits on the range of control signal or on the rate at which the control signal may be slewed.

BRIEF DESCRIPTION OF THE DRAWINGS

The foregoing features of the invention will be more readily understood by reference to the following detailed description, taken with reference to the accompanying drawings, in which:

FIG. 5A is a top view of a transporter maneuvered by a user accompanying the device, while

DETAILED DESCRIPTION OF SPECIFIC EMBODIMENTS

Figure 1:
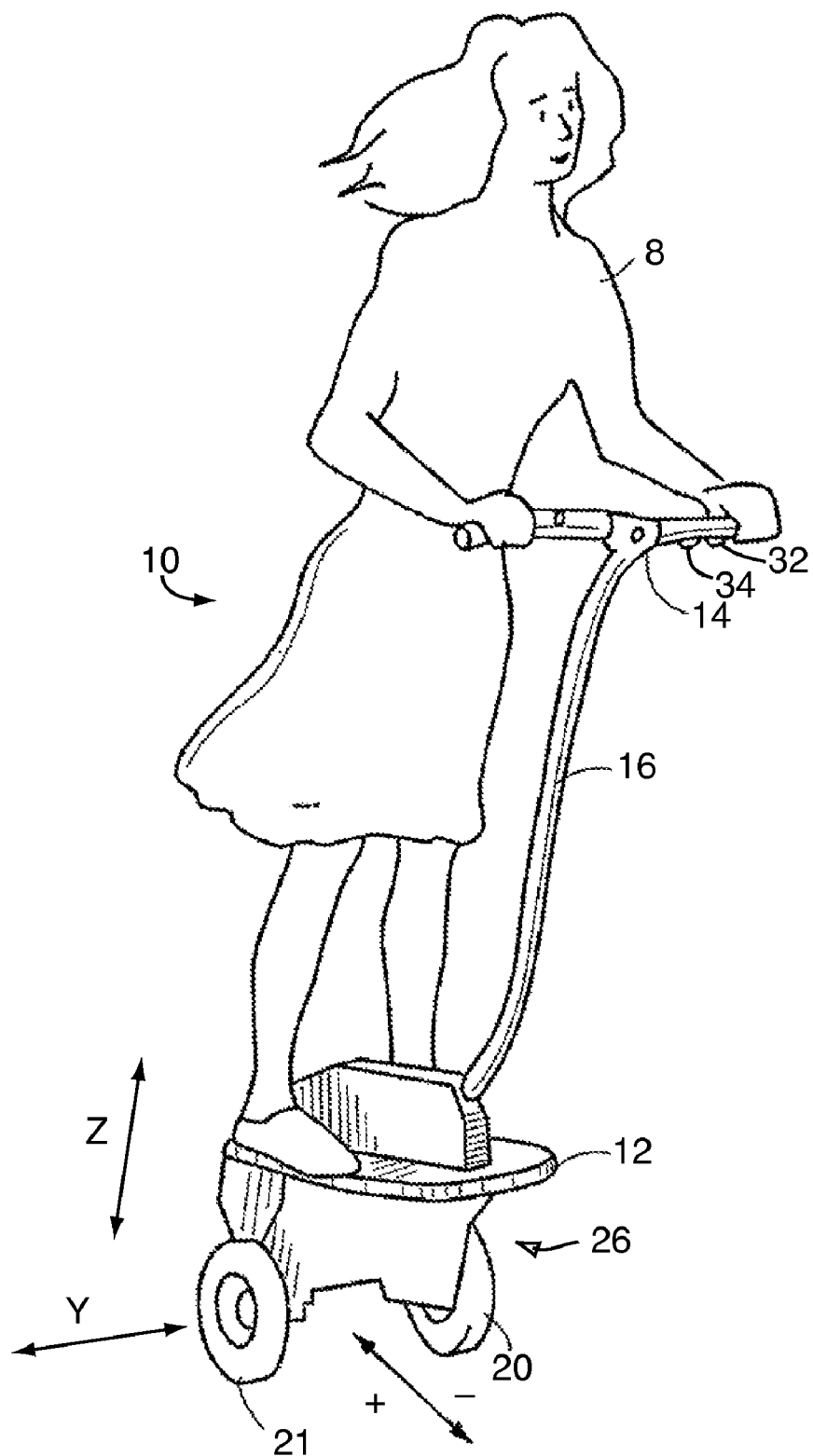
FIG. 1 depicts one embodiment of a human transporter to which the present invention may advantageously be applied.

FIG. 1 shows a transporter, designated generally by numeral 10, of a sort to which the present invention may advantageously be applied. Transporter 10 is described in detail in U.S. Pat. No. 6,302,230, which is incorporated herein by reference in its entirety.

A characteristic of many transporter embodiments to which the present invention may be applied is the use of a pair of laterally disposed ground-contacting members 20 and 21 to suspend a subject 8 over a surface with respect to which the subject is being transported on a support platform 12. The ground or other surface, such as a floor, over which a vehicle in accordance with the invention is employed may be referred to generally herein as the "ground." The ground-contacting members 20, 21, here depicted as wheels, are typically motor-driven. In many embodiments, the configuration in which the subject is suspended during locomotion lacks inherent stability in the fore-aft plane at least a portion of the time with respect to a vertical (axis z) but is relatively stable with respect to a vertical in the lateral plane.

Some embodiments of the invention may invoke the concept of primary wheels. The term "primary wheels," as used in this description and in any appended claims, refers to a minimum set of a vehicle's wheels on which the vehicle is capable of operating stably. More generally, the term "primary ground-contacting members" allows for a more general class of members, that includes, but is not limited to, wheels. Hence, as used in this description and in any appended claims, "primary ground-contacting members" refers to a minimum set of a vehicle's ground-contacting members on which the vehicle is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. As described below, a pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the vehicle is not in locomotion, the center of mass of the vehicle above the region of contact of the ground-contacting members with the ground, regardless of disturbances and forces operative on the vehicle. The term "motorized drive" as used in this description and the following claims means any vehicle that produces mechanical power regardless of means, and therefore includes a motor that is electric, hydraulic, pneumatic, or thermodynamic (the latter including an internal combustion or an external combustion engine) together with any appropriate arrangement for transmission of such mechanical power; or a thrust-producing device such as a turbojet engine or a motor-driven propeller.

Figure 2:
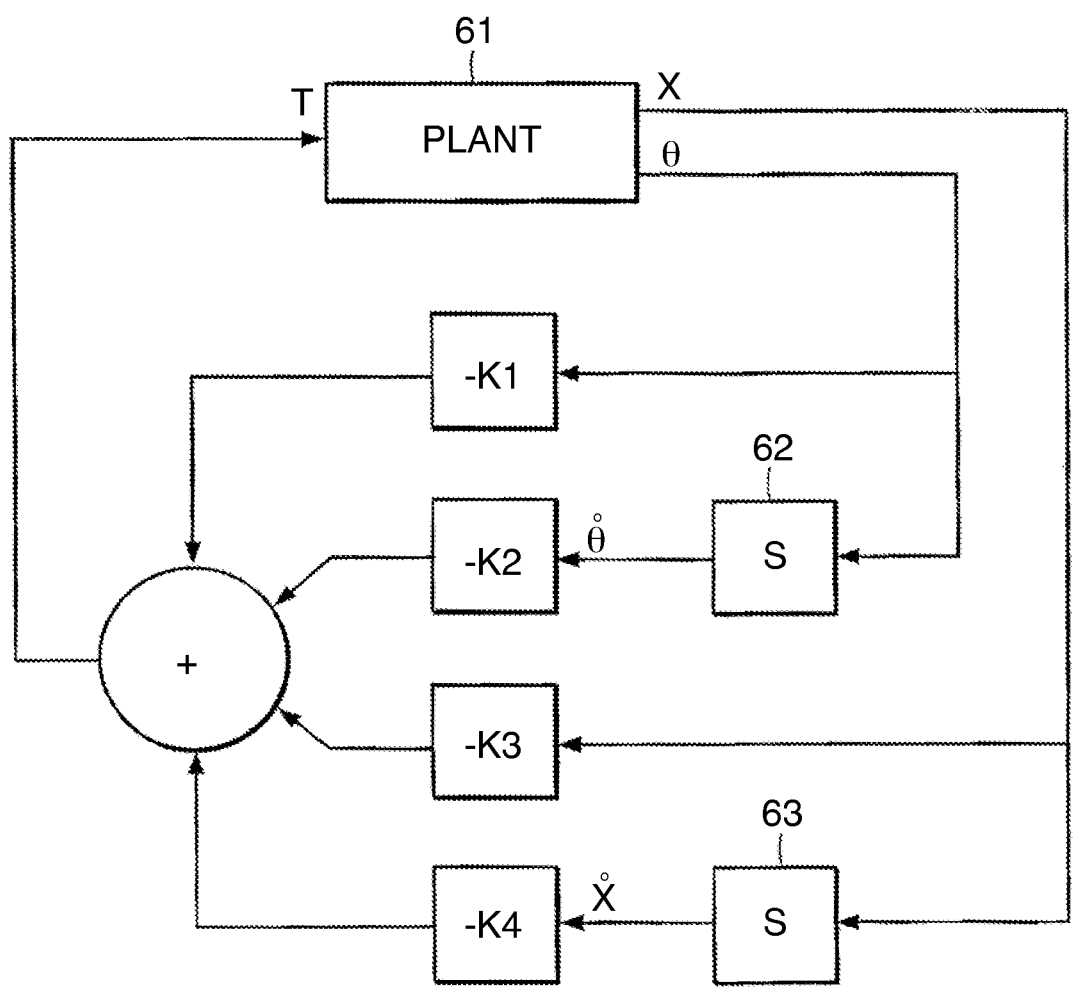
FIG. 2 is a basic block diagram of a controller of a transporter, in accordance with embodiments of the invention.
Figure 3:
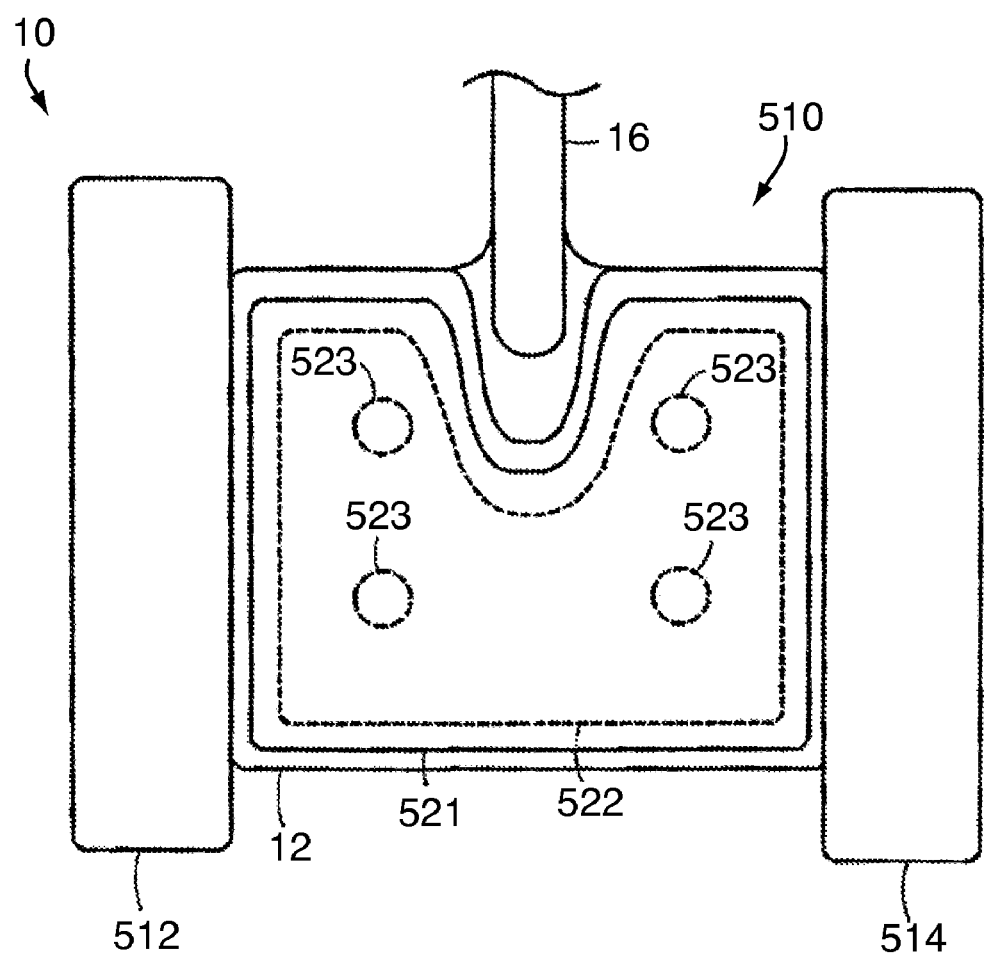
FIG. 3 is a top view of the platform of the transporter of FIG. 1, showing a rider detector in accordance with an embodiment of the invention.
Figure 7:
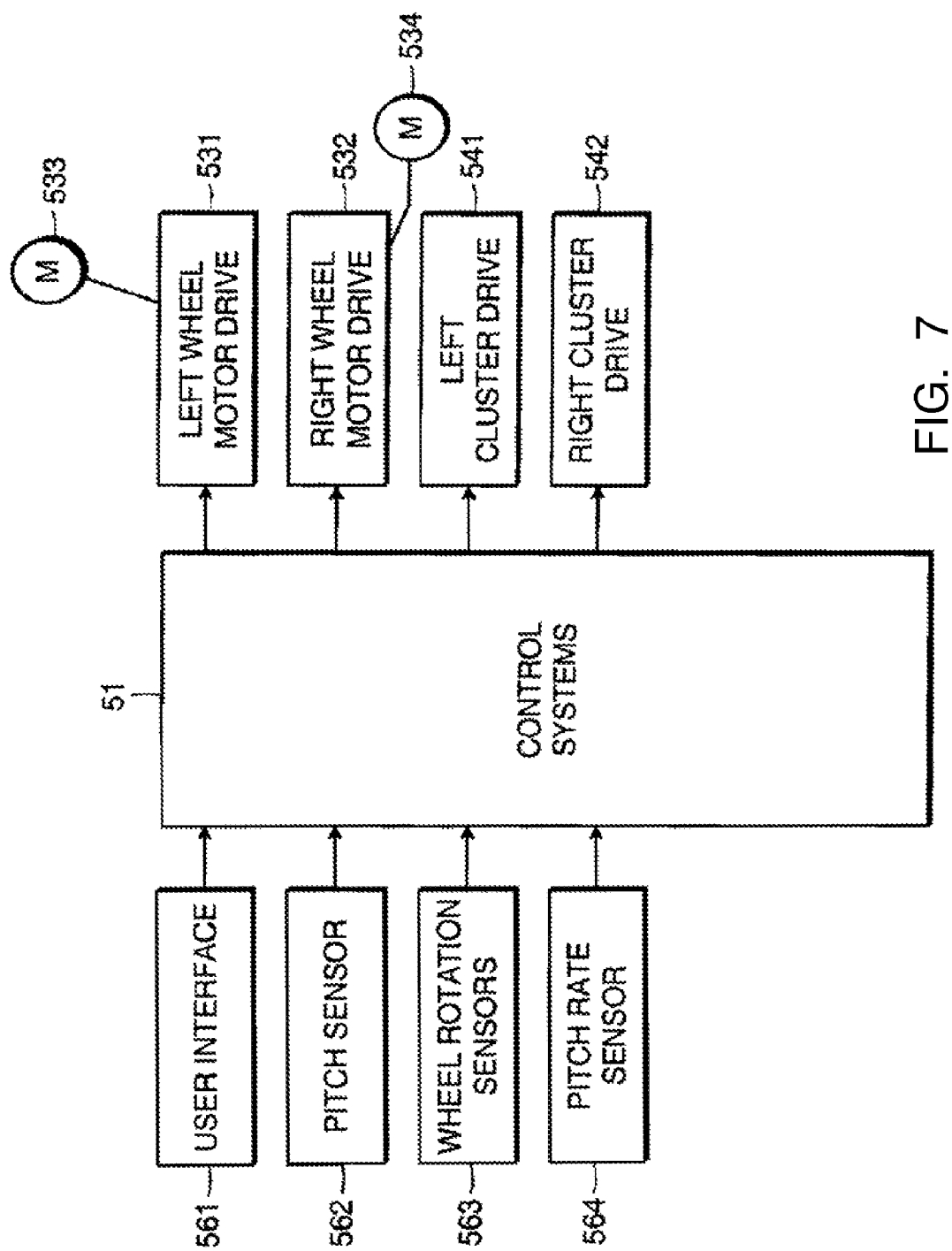
FIG. 7 is a block diagram showing generally the nature of sensors, power and control with the embodiment of FIG. 1.

In the block diagram of FIG. 7 it can be seen that a control system 51 is used to control the motor drives and actuators of the embodiment of FIGS. 1-3 to achieve locomotion and balance. These include motor drives 531 and 532 for left and right wheels respectively. If clusters are present, actuators 541 and 542 for left and right clusters respectively. The control system has data inputs including user interface 561, pitch sensor 562 for sensing fore-aft pitch, and wheel rotation sensors 563, and pitch rate sensor 564. Pitch rate and pitch may be derived through the use of gyroscopes or inclinometers, for example, alone or in combination.

A ground-contacting member typically has a "point" (actually, a region) of contact or tangency with the surface over which the vehicle is traveling or standing. Due to the compliance of the ground-contacting member, the "point" of contact is actually an area, where the region of contact may also be referred to as a contact patch. The weight of the vehicle is distributed over the contact region, giving rise to a distribution of pressures over the region, with the center of pressure displaced forward during forward notion. The distribution of pressures is a function both of the composition and structure of the wheel, the rotational velocity of the wheel, the torque applied to the wheel, and thus of the frictional forces acting on the wheel.

A force in the direction of motion is required to overcome rolling friction (and other frictional forces, including air resistance). Gravity may be used, in accordance with preferred embodiments of the invention, to provide a torque about the point of contact with the surface in a direction having a component in the sense of desired motion.

Referring further to FIG. 1, user 8 is shown standing on platform (or 'base') 12 of ground-contacting module 26. Wheels 21 and 22 are shown as coaxial about the Y axis. Steering or other control may be provided by one or more thumbwheels 32 and 34, or by other user input mechanisms such as those described in detail in U.S. Pat. No. 6,288,505, herein incorporated by reference. Any user input device that provides the functions discussed below is within the scope of the present invention. Finally, a handlebar 14 is shown as may be provided on stalk 16 for gripping by the user.

A simplified control algorithm for achieving balance in the embodiment of the invention according to FIG. 1, when the wheels are active for locomotion, is shown in the block diagram of FIG. 2. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta - \theta_0) + K_2(\dot{\theta} - \dot{\theta}_0) + K_3(x - x_0) + K_4(\dot{x} - \dot{x}_0), \quad \text{(Eqn. 1)}$$

where:
T denotes a torque applied to a ground-contacting element about its axis of rotation;
θ is a quantity corresponding to the lean of the entire system about the ground contact, with $\theta_0$ representing the magnitude of a system pitch offset, all as discussed in detail below;
x identifies the fore-aft displacement along the surface relative to a fiducial reference point, with $x_0$ representing the magnitude of a specified fiducial reference offset;
a dot over a character denotes a variable differentiated with respect to time; and
a subscripted variable denotes a specified offset that may be input into the system as described below; and
$K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 2 maintains balance and also proximity to the reference point on the surface in the presence of disturbances such as changes to the system's center of mass with respect to the reference point on the surface due to body motion of the subject or contact with other persons or objects. It should be noted that the amplifier control may be configured to control motor current (in which case torque T is commanded, as shown in FIG. 2) or, alternatively, the voltage applied to the motor may be controlled, in which case the commanded parameter is velocity.

The effect of $\theta_0$ in the above control equation (Eqn. 1) is to produce a specified offset $\theta_0$ from the non-pitched position where θ=0. Adjustment of $\theta_0$ will adjust the vehicle's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. For example, when operating the vehicle on an incline, it may be desirable for the operator to stand erect with respect to gravity when the vehicle is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

Alternatively, $\theta_0$ can be set by the control system of the vehicle as a method of limiting the speed and/or the performance of the vehicle.

The magnitude of $K_3$ determines the extent to which the vehicle will seek to return to a given location. With a non-zero $K_3$, the effect of $x_0$ is to produce a specified offset $-x_0$ from the fiducial reference by which x is measured. When $K_3$ is zero, the vehicle has no bias to return to a given location. The consequence of this is that if the vehicle is caused to lean in a forward direction, the vehicle will move in a forward direction, thereby maintaining balance.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the vehicle is moving.

"Stability" as used in this description and in any appended claims refers to the mechanical condition of an operating position with respect to which the system will naturally return if the system is perturbed away from the operating position in any respect.

In order to accommodate two wheels instead of the one-wheel system illustrated for simplicity in FIG. 2, separate motors may be provided for left and right wheels of the vehicle and the torque desired from the left motor and the torque to be applied by the right motor can be governed in the general manner described below in connection with FIG. 4. Additionally, tracking both the left wheel motion and the right wheel motion permits adjustments to be made to prevent unwanted turning of the vehicle and to account for performance variations between the two drive motors.

Operating modes of the transporter may include modes wherein the rider is supported by the transporter but may also include modes where the rider is not supported by the transporter. For example, it may be advantageous for the rider to be able to 'drive' or to 'conduct' the transporter while walking alongside or behind it.

FIG. 3 shows a rider detection mechanism used in an embodiment of the present invention, as described in detail in U.S. Pat. No. 6,288,505. When the absence of a rider is detected, the transporter is allowed to operate in one or more riderless modes. FIG. 3 shows a top view of the rider detector designated generally by numeral 510. Transporter 10 incorporating the rider detector includes a base 12, left wheel fender 512, right wheel fender 514, support stem 16 for handlebar 14 (shown in FIG. 1). Wheel fenders 512 and 514 cover the corresponding wheels. Support stem 16 is attached to the base 12 and provides a sealed conduit for transmission of signals from controls 32, 34 (shown in FIG. 1) that may be located on the handlebar to the control electronics sealed in the base 12. Wheel fenders 512, 514 are rigidly attached to the sides of the base.

The top of base 12 provides a substantially flat surface and is sized to comfortably support a rider standing on the base 12. A mat 521 covers the top of the base 12 and provides additional protection to the base 12 from particles and dust from the environment. In an alternate embodiment, the mat may also cover part of the fenders 512 514 and may be used to cover a charger port (not shown) that provides for external charging of the power supply. Mat 521 may be made of an elastomeric material that provides sufficient traction such that the rider does not slip off the mat 521 under expected operating conditions. A plate 522 is positioned between base 12 and mat 521. Plate 522 is made of a rigid material and evenly distributes the force acting on the plate 522 from the rider's feet such that at least one rider detection switch 523 is activated when a rider is standing on the mat.

Figure 4:
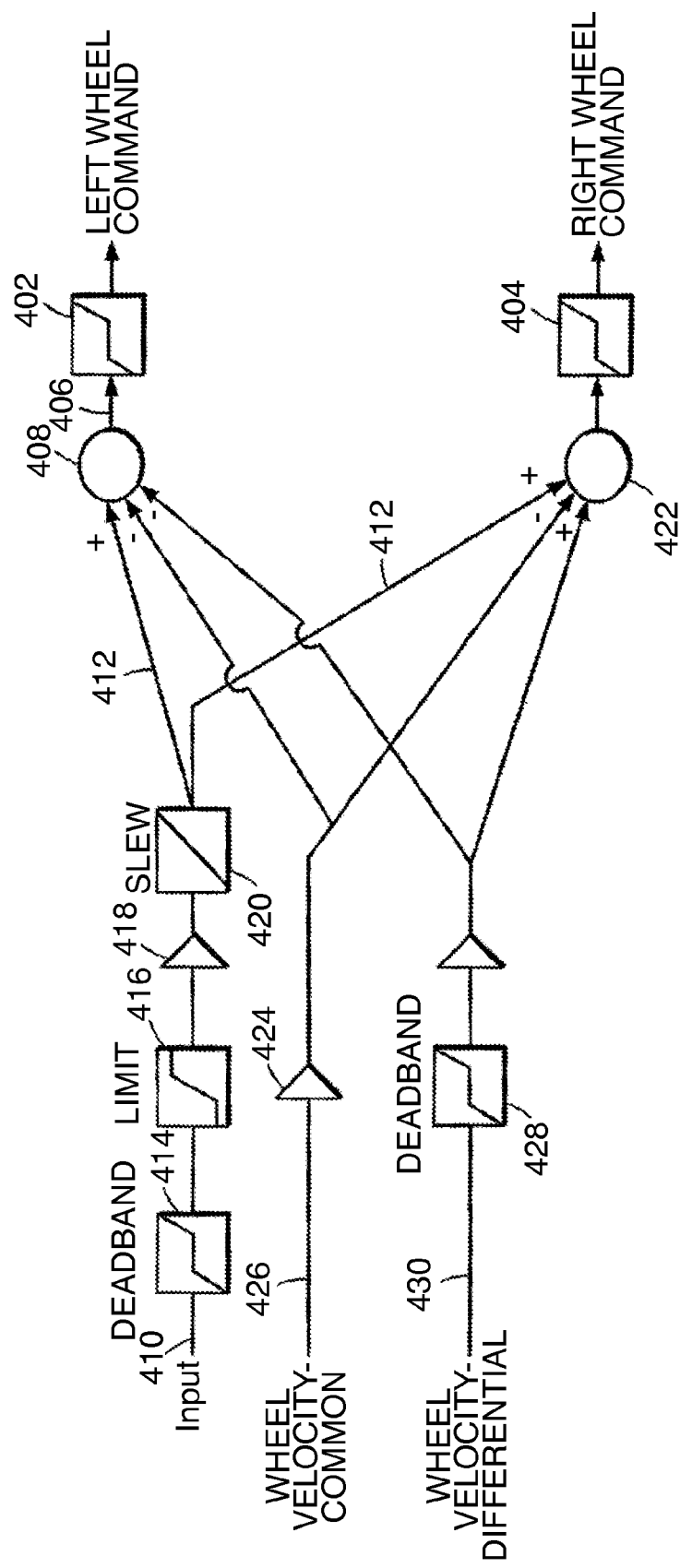
FIG. 4 is a block diagram of a follow-mode controller in accordance with one embodiment of the invention.

Referring now to FIG. 4, a schematic is shown of a control mode, referred to as 'follow mode,' wherein a user may guide operation of a two-wheeled transporter while walking alongside or behind the transporter rather than being supported by it as in ordinary operation of the transporter.

FIG. 4 depicts the manner in which command signals are derived for each of the wheel motor amplifiers, the left wheel command 402 and the right wheel command 404. Application of motor commands to govern wheel actuators to drive wheels 20 and 21 is described in U.S. Pat. No. 6,288,505. Each wheel command is the result of a signal 406 described here in regard to the left wheel for purposes of illustration. Multiple terms contribute to signal 406 and they are coadded at summer 408, with the signs of the respective terms as now described.

It is to be understood that various modes of motor control are within the scope of the invention. For example, the motors may be commanded in current mode, wherein the torque applied to the wheels is commanded and, as shown below, ultimate subject to user input. Thus, the user governs how much torque is applied. This is a mode of operation that users tend to be comfortable with, allowing a user to urge the transporter over an obstacle or up a curb or a stair. On the other hand, the wheel motors may be governed in voltage mode, where wheel velocity is controlled by the user input.

User input 410 is received from a user input device which may be thumbwheel 32 (shown in FIG. 1) or may be another user input device. User input 410 leads to generation of a control signal 412. User input is typically condition in one or more manners to generate control signal 412. For example, a deadband 414 may be provided such that the range of no response is extended about zero. As another example, the range of control signal in response to user input may be limited by a limiter 416. Any manner of tailoring of the response of the control signal to user input is within the scope of the present invention. A gain is provided by amplifier 418, where the gain may be constant or dependent upon various parameters. In particular, the gain scheduling may differ between the rider and riderless modes, both as to magnitude of gain, and, in the hand truck embodiment discussed below, the sense of the response to user input may also advantageously be made variable.

Moreover, the slew rate of change of the commanded control signal may be limited by slew limiter 420.

In addition to control signal 412 which is applied, via summers 408 and 422 to the respective wheel amplifiers, a counteracting contribution to wheel torque is provided that is proportional, modulo gain 424, to the common component 426 of the rotational velocity of the respective right and left wheels. Since the counteracting component is proportional to velocity, it acts as an artificially imposed friction and the user feels a resistance to pushing (or pulling) the transporter.

Finally, a differential term, proportional, above a threshold set by deadband 428, to the differential rotational velocity 430 of the two wheels. This allows the faux friction of the preceding term to be overcome in the case where the user seeks to turn the transporter.

As suggested above, transporter 10 may be guided by a user walking ahead of, behind, or alongside, the transporter. When operated without a mounted user, transporter 10 may operate in either a 'power assist' mode or in the same mode of operation as when bearing the user, in which case it operates in a 'riderless balancing mode'.

If the transporter is being operated in balance mode, and if the user is no longer sensed by rider detection switch 523, then limits may be placed on the distance the transporter may be moved from its position at the time a user was last onboard the transporter, as sensed by rider detect switch 523 or other means. This function, which may be referred to as an "electronic leash," may be used as an added safety feature to limit unintended travel of the transporter. Travel of the transporter may be limited such that the transporter is decelerated to a slow speed or a stop after a specified distance with respect to a fiducial reference position, set when the rider dismounts, or under other circumstances discussed below. Additionally, once the transporter is slowed or stopped, the transporter may be switched out of balance mode and/or may be powered off until such time as a user restarts the transporter. The distance of travel before such an electronic leash is activated may be set based on the desired performance of the transporter. For example, a distance on the order two meters may be used. The distance of travel may be determined by integrating the velocity of the transporter as determined by sensing rotation of the wheels from the position of the transporter at the time a user was last onboard the transporter, as sensed by rider detect switch 523 or other means. Alternatively, distance may be determined by other means, such as an onboard GPS receiver.

In another specific embodiment, if the user is no longer sensed by rider detection switch 523 or other means, then limits may be placed on the speed the transporter may attain. If the transporter attains a specified speed without a user aboard, then the transporter may be decelerated to a slower speed or a stop.

In the case transporter 10 is actively guided by a user in balance mode, the electronic leash may be deactivated to allow travel beyond the distanced specified for the electronic leash. Alternatively, if a user repeatedly dismounts from transporter, actively guides the transporter for short distances, such as to traverse a curb or a flight of stairs, and then remounts the transporter, it may be advantageous to continue to use the electronic leash. In this case, however, the user may wish to guide the transporter further than the distance specified by the electronic leash, for example to climb a long flight of stairs. In such a case, the electronic leash may advantageously be reset, accordingly updating the fiducial reference, to allow further riderless travel in balance mode while still guarding against unintended travel of the transporter.

One method of resetting the electronic leash while still avoiding unintended travel is to slew the wheel position variable to zero whenever the velocity of the transporter reaches or falls below a specified level, such as 0.5 mi/hr. Thus, a user may guide the transporter further than the distance specified by the electronic leash, for example to climb a large flight of stairs, while still guarding against unintended travel of the transporter. Alternatively, a user input device may be used to alternatively activate and deactivate the electronic leash or to reset the electronic leash.

Figure 5A:
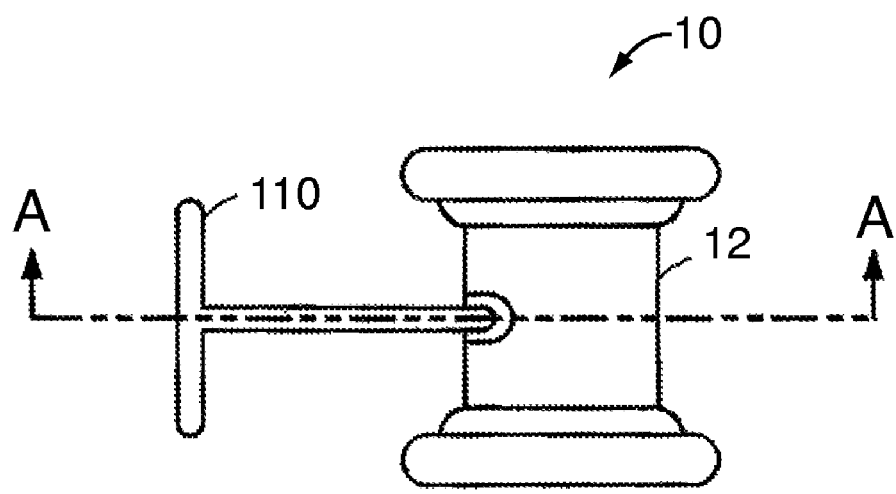
Figure 5B:
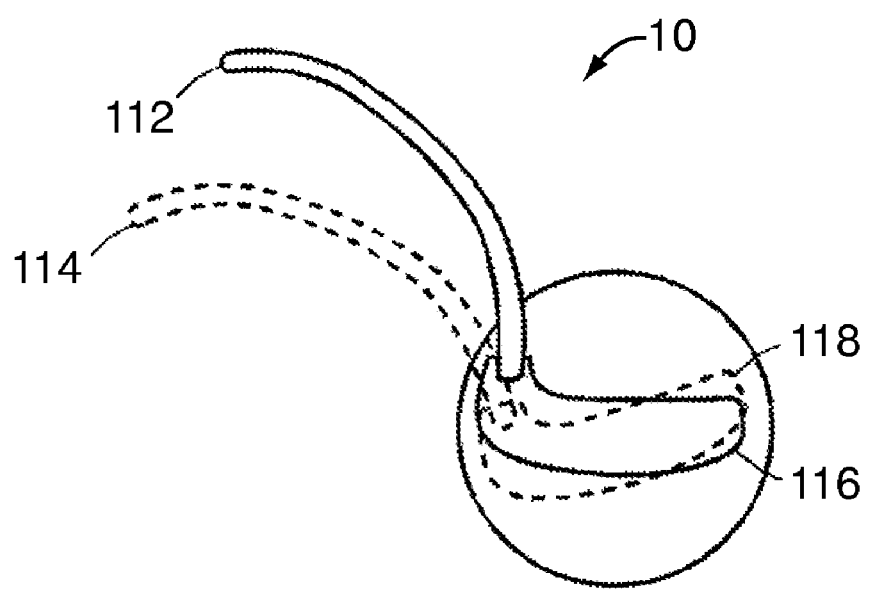
FIG. 5B is a sectional view from the side through line A-A of the same transporter in two attitudes.

Embodiments of the invention advantageously employing these capabilities are described with reference to FIGS. 5 and 6. In particular, FIG. 5A shows handle 110 configured forward of platform base 12. Handle 110 may be drawn by a user and forward motion induced by leaning the handle from position 112 to position 114. Leaning the handle causes concomitant leaning of the platform from position 116 to position 118. Similarly, drawing handle 110 upward causes transporter 10 to decelerate and stop. This mode of operation may be referred to as a 'guided mule' mode.

Figure 6A:
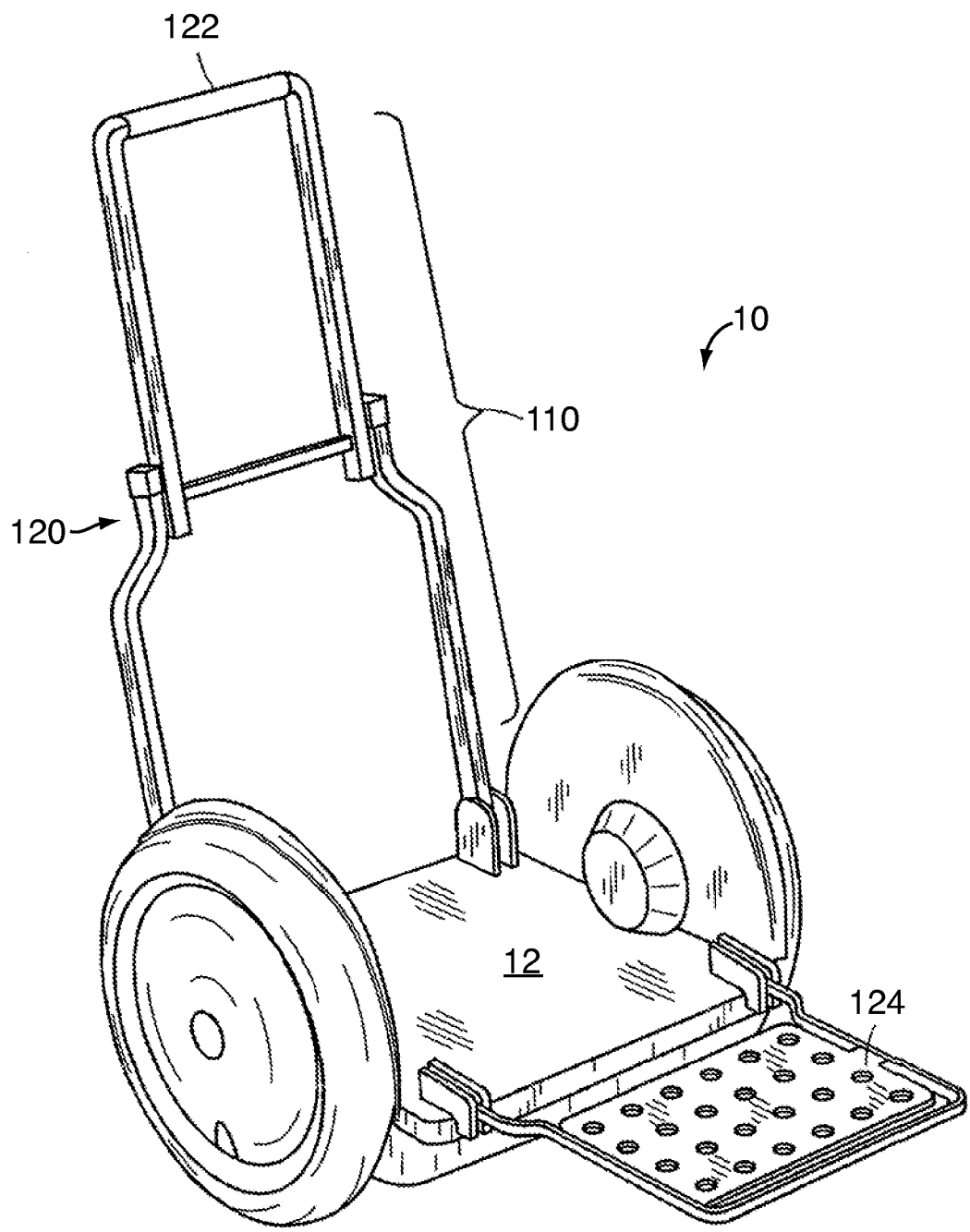
FIG. 6A is a perspective view of a transporter configured as a hand truck for accompanied locomotion.
Figure 6B:
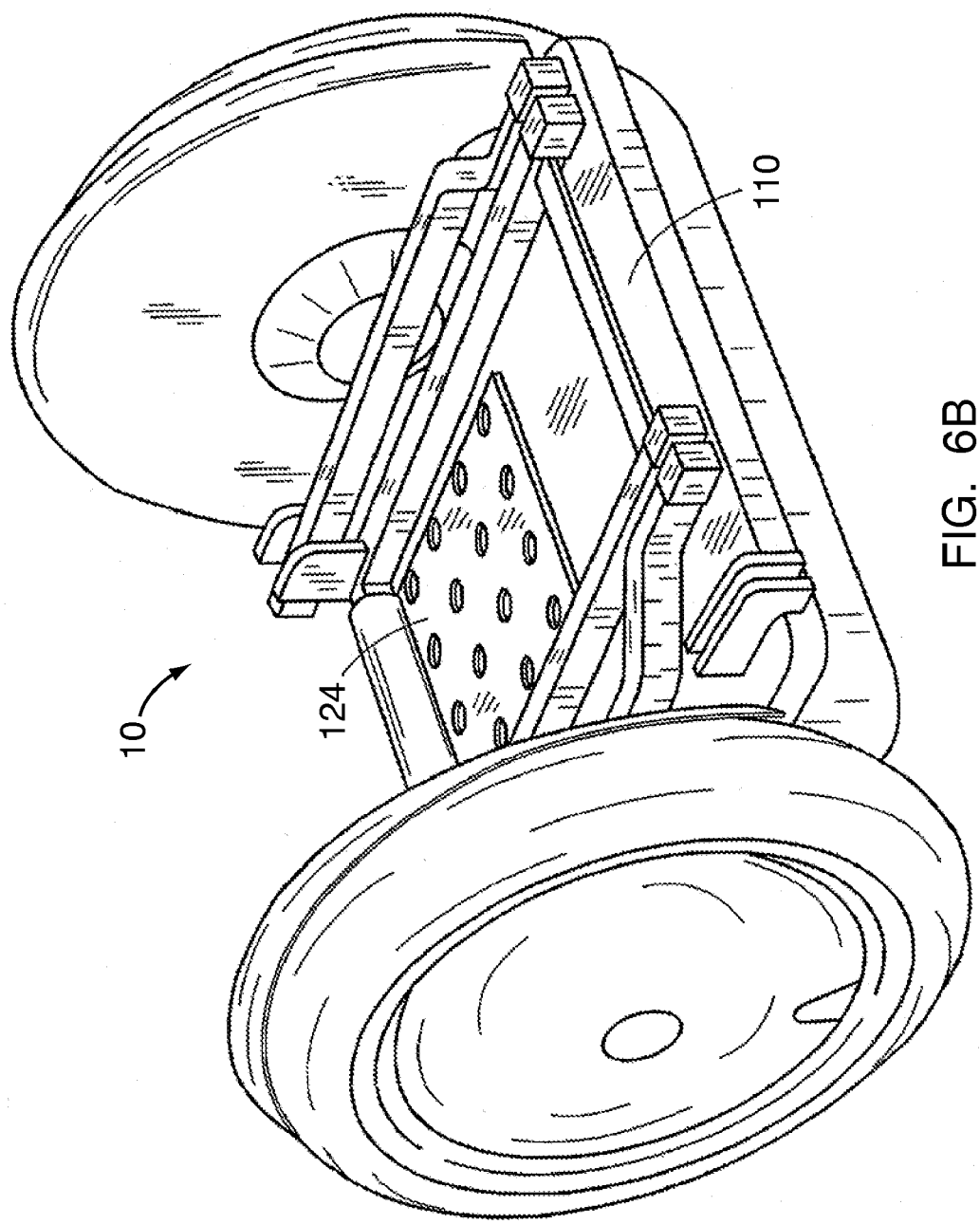
FIG. 6B is perspective view of the transporter of FIG. 6A with folded components in accordance with embodiments of the present invention.

FIG. 6A shows a transporter device 10 with handle 110 disposed aft of platform 12 for powered operation in a 'hand truck' mode. Handle 110 may be extended at joint 120, which may be, for example, pivotal, as shown, or may be an extensible sleeve. Moreover, a 'dead-man' switch 122 may be provided to ensure operation of the transporter only under active control of a user. Additionally, a platform extension 124 may provide additional support surface. Transporter 10, in the embodiment of FIG. 6A, may be collapsed for storage and conveyance as shown in FIG. 6B. Handle 110 and platform 124 are shown in a folded position to minimize the volume required to contain the transporter.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A transporter for transporting a load over a surface, the transporter comprising:
   a. a support platform for supporting the load, the support platform characterized by a fore-aft axis, a lateral axis, and an orientation with respect to the surface, the orientation referred to as an attitude;
   b. at least two ground-contacting members coupled to the support platform in such a manner as to provide locomotion of the support platform with respect to an underlying surface;
   c. a motorized drive arrangement for driving the at least two ground-contacting members;
   d. a user input for receiving a command from a user not carried by the transporter to govern operation of the motorized drive arrangement;
   e. at least one sensor sensing the attitude of the support platform; and
   f. a controller for commanding the motorized drive arrangement based at least on the attitude of the support platform, the controller generating a control signal based on the user input and commanding the motorized drive on the basis of a sum of coadded terms including at least a first term proportional to the control signal and a second term defining a counteracting contribution proportional to a common component of rotational velocity of the ground contacting members.

2. The transporter according to claim 1, additionally comprising a ride detector detecting a presence of the user on the transporter.

3. The transporter according to claim 2, wherein the controller determines a gain to apply to the control signal based on a signal from the ride detector.

4. A transporter for transporting a load over a surface, the transporter comprising:

a. a support platform for supporting the load, the support platform characterized by a fore-aft axis, a lateral axis, and an orientation with respect to the surface, the orientation referred to as an attitude;
b. at least one ground-contacting member coupled to the support platform in such a manner as to provide locomotion of the support platform with respect to an underlying surface;
c. a motorized drive arrangement for driving the at least one ground-contacting member;
d. a user input for receiving a command from a user not carried by the transporter to govern operation of the motorized drive arrangement;
e. a ride detector detecting a presence of the user on the transporter;
f. at least one sensor sensing the attitude of the support platform; and
g. a controller for commanding the motorized drive arrangement, the controller determining a gain to apply to the control signal based on a signal from the ride detector and generating a control signal for the motorized drive arrangement based on the user input and on the attitude of the support platform.

* * * * *